Oct. 15, 1946.   C. L. MARTIN   2,409,294
PASSAGE PLUG
Filed Nov. 15, 1943

Inventor
CHARLES L. MARTIN

By George R. Ericson
Attorney

Patented Oct. 15, 1946

2,409,294

UNITED STATES PATENT OFFICE 2,409,294

PASSAGE PLUG

Charles L. Martin, Overland, Mo., assignor to Carter Carburetor Corporation, St. Louis, Mo., a corporation of Delaware Application November 15, 1943, Serial No. 510,438

6 Claims. (Cl. 138—44)

This invention relates to passage plugs and consists in a novel plug device having a rigid body portion and flexible embedding structure arranged so that the body portion is not distorted when the plug is forcefully lodged in an orifice, to spread the embedding structure and secure the plug within the passage.

The invention has particular utility where a measured restriction must be inserted in a larger passage or opening. Other plug devices with which applicant is familiar, that is of the wedging or frictional type, necessitate distortion of the body of the plug so that such plugs could not be used as calibrated measuring restrictions.

In the accompanying drawing which illustrates the invention,

Figure 1:
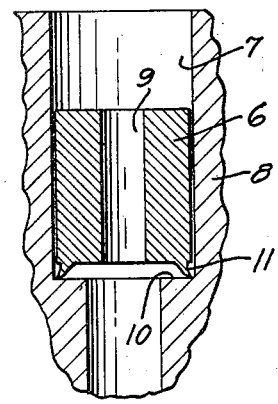
Fig. 1 is a section illustrating the plug inserted in a passage, but prior to the application of securing pressure thereto.
Figure 2:
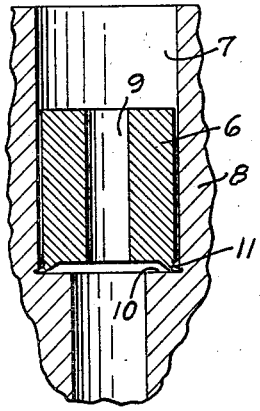
Fig. 2 is a view of the plug after the application of pressure thereto.
Figure 3:
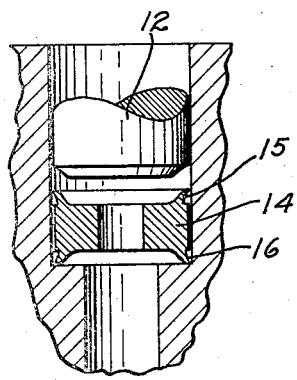
Fig. 3 is a view of a modified form of plug prior to the application of wedging pressure.

In Figs. 1 and 2, the plug comprises a rigid body part 6 shaped to fit the enlarged passage portion 7 in a wall 8 and having a calibrated axial orifice 9. Passage 7 is annularly shouldered at 10 and, in Fig. 1, the downwardly and outwardly inclined annular lip structure 11 extending around the periphery of the plug body rests upon this shoulder. To lodge the plug in position, axial pressure is applied thereto, as by a punch 12, as illustrated in Fig. 3. This pressure causes lip structure 11 to spread, as in Fig. 2, and becomes embedded in the passage wall so that the plug is securely held in position and the space between the wall and plug is effectively sealed. However, because of the rigid body construction, orifice 9 is not distorted by the application of lodging pressure.

Figure 4:
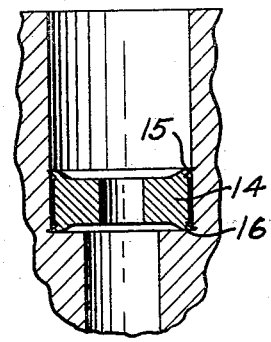
Fig. 4 is a view of the plug in Fig. 3 after the flexible lips are embedded in the passage wall.

In Figs. 3 and 4, the plug has a rigid body portion 14 and outwardly inclined lip structures 15 and 16 projecting from the upper and lower surfaces thereof. Fig. 4 shows the plug after the application of wedging pressure thereto by the tool 12 which causes the lip structures to be spread and embedded in the passage wall, as in the first form.

The invention permits the formation of the orificed plug element in a suitable automatic machine so that the orifice may be very carefully calibrated, while the wall structure 8 and shouldered passage 7 may be more roughly formed by casting or by casting and boring.

The invention may be modified in various respects as will occur to those skilled in the art and the exclusive use of all modifications as come within the scope of the appended claims is contemplated.

I claim:

1. A passage plug comprising a rigid body part for closely fitting an orifice and an axially projecting element for embedding in the orifice wall upon the application of axial pressure to the plug when lodged in an orifice, said element being distortable on application to an orifice to firmly maintain the assembly therewith.

2. A passage plug comprising a rigid body part having an orifice therethrough and an annular, flexible projection for embedding in an orifice wall upon the application of axial pressure to the plug when lodged in the orifice, said projection being distortable upon application to an orifice without causing distortion of said body part.

3. A passage plug comprising a rigid body part having a measured orifice extending axially therethrough, and an annular, flexible projection for embedding in an orifice wall upon the application of axial pressure to the plug when lodged in the orifice, said projection being distortable upon application to an orifice without affecting said orifice.

4. A passage plug comprising a rigid body portion and a peripheral lip projecting axially therefrom, said lip being flexible so as to spread upon the application of axial pressure to the plug when lodged in an orifice.

5. In combination, a wall having an opening, and a perforated plug pressed into said opening and comprising a rigid body part and flexible lip structure distorted by the application of axial pressure to said body part so as to embed itself into the wall of the opening.

6. In combination, a wall having a passage provided with an internal shoulder, and a passaged plug forcefully lodged against said shoulder, said plug comprising a body portion with a measured orifice and axially projecting, lip structure embedded in the passage wall and distortable by the lodging pressure without distorting said body portion or orifice.

CHARLES L. MARTIN.